(12) United States Patent
Matsuda

(10) Patent No.: US 7,787,158 B2
(45) Date of Patent: Aug. 31, 2010

(54) DATA PROCESSING APPARATUS, IMAGE PROCESSING APPARATUS, DATA PROCESSING METHOD, IMAGE PROCESSING METHOD, AND PROGRAMS FOR IMPLEMENTING THE METHODS

(75) Inventor: Kotaro Matsuda, Kawasaki (JP)

(73) Assignee: Canon Kabushiki Kaisha (JP)

(*) Notice: Subject to any disclaimer, the term of this patent is extended or adjusted under 35 U.S.C. 154(b) by 1219 days.

(21) Appl. No.: 11/343,997

(22) Filed: Jan. 31, 2006

(65) Prior Publication Data

US 2006/0170984 A1 Aug. 3, 2006

(30) Foreign Application Priority Data

Feb. 1, 2005 (JP) ............................. 2005-025613

(51) Int. Cl.
*H04N 1/40* (2006.01)
(52) U.S. Cl. ...................... 358/462; 358/474; 382/309; 382/311
(58) Field of Classification Search ...................... None
See application file for complete search history.

(56) References Cited

U.S. PATENT DOCUMENTS

| | | | |
|---|---|---|---|
| 4,949,392 A | 8/1990 | Barski et al. | |
| 5,608,874 A | 3/1997 | Ogawa et al. | |
| 5,850,490 A | 12/1998 | Johnson | |
| 6,026,187 A * | 2/2000 | Siegel | 382/213 |
| 6,298,151 B1 * | 10/2001 | Jodoin et al. | 382/176 |
| 6,341,176 B1 * | 1/2002 | Shirasaki et al. | 382/229 |
| 6,665,839 B1 * | 12/2003 | Zlotnick | 715/223 |
| 6,778,703 B1 * | 8/2004 | Zlotnick | 382/218 |
| 6,980,698 B2 * | 12/2005 | Eschbach et al. | 382/278 |
| 7,054,509 B2 * | 5/2006 | Rom | 382/306 |
| 7,106,904 B2 * | 9/2006 | Shima | 382/216 |
| 7,215,434 B1 * | 5/2007 | Janse et al. | 358/1.15 |
| 7,280,693 B2 * | 10/2007 | Kurokawa et al. | 382/173 |
| 7,383,328 B2 * | 6/2008 | Iyoki | 709/222 |
| 7,424,672 B2 * | 9/2008 | Simske et al. | 715/243 |
| 7,426,486 B2 * | 9/2008 | Treibach-Heck et al. | 705/32 |
| 7,460,736 B2 * | 12/2008 | Iinuma et al. | 382/305 |

(Continued)

FOREIGN PATENT DOCUMENTS

EP 1 345 162 A2 9/2003

(Continued)

OTHER PUBLICATIONS

Relevant portion of European Search Report of corresponding European Application EP 06 25 0555, May 15, 2006.

(Continued)

*Primary Examiner*—Mark K Zimmerman
*Assistant Examiner*—Dung D Tran
(74) *Attorney, Agent, or Firm*—Rossi, Kimms & McDowell LLP

(57) ABSTRACT

A data processing apparatus that is capable of improving the accuracy with which form types can be identified. An image file of a form and an additional file including a form type ID of the form are inputted. A character recognition process on the image file is carried out based on the form type ID. The image file and a result obtained in the character recognition process are stored in a storage device 103.

9 Claims, 19 Drawing Sheets

U.S. PATENT DOCUMENTS

| | | | |
|---|---|---|---|
| 7,573,615 B2* | 8/2009 | Kasatani | 358/402 |
| 2002/0176628 A1* | 11/2002 | Starkweather | 382/229 |
| 2002/0196479 A1* | 12/2002 | Simske | 358/474 |
| 2003/0169925 A1* | 9/2003 | Polonowski | 382/198 |
| 2005/0073732 A1* | 4/2005 | Benedicto et al. | 358/527 |
| 2006/0170960 A1* | 8/2006 | Koike | 358/1.15 |
| 2007/0147710 A1* | 6/2007 | Kanamoto et al. | 382/309 |

FOREIGN PATENT DOCUMENTS

| | | |
|---|---|---|
| EP | 1 345 162 A3 | 10/2003 |
| GB | 2 287 819 A | 9/1995 |
| JP | 2000-285187 A | 10/2000 |
| JP | 2000-293596 A | 10/2000 |

OTHER PUBLICATIONS

Captiva Software Corp.; "FormWare: Universal Information Capturing Software"; Accessed online on Mar. 22, 2003; Retrieved from the Internet: http://web.archive.org/web/20030322014533/http://www.captivasoftware.co.uk/downloads/FormWare.pdf.

* cited by examiner

```
<MenuItem>
  <Name>PERSONAL LOAN</Name>
  <Message>PLEASE INDICATE YOUR SALARY ON THE PERSONAL LOAN APPLICATION FORM. AFTER CHECKING, PLEASE SET THE FORM ON THE SCANNER AND PRESS START.
  </Message>
  <ScanForm>
    <FormName>PERSONAL LOAN APPLICATION FORM</FormName>
    <FormId>loan_xxx_yyy_001</FormId>
  </ScanForm>
</MenuItem>
```

FIG. 10

| FORM TYPE ID | FORM TYPE NAME | FORM FILE |
|---|---|---|
| loan_xxx_yyy_001 | PERSONAL LOAN APPLICATION FORM | ¥¥localhost¥loan.tif |
| addr_xxx_yyy_002 | CHANGE OF ADDRESS FORM | ¥¥localhost¥addr.tif |

| CONFIGURATION ALIAS | 1201 |
|---|---|
| BUSINESS PROCESS CONSTRUCTION FOR SALES DEPARTMENT | |

EDIT CONSTRUCTION
- MENU CONSTRUCTION
- FORM TYPES
- IMAGE FILES

FILE TYPE — 1202
[APPLICATION FORM]

SCAN SETTINGS — 1203
[DOUBLE-SIDED ▼]
[300dpi ▼]
[FULL COLOR ▼]

NUMBER OF PAGES
[4] — 1204

FORM FILE FOR PRINTING
[C:¥print_data¥loan.tif] [BROWSE]

OPERATION — 1205

[STORE] — 1206  [CANCEL] — 1207

FIG. 14

| MFP MACHINE ID | MFP MACHINE ALIAS | CONFIGURATION ALIAS ID |
|---|---|---|
| MFP_xxx_001 | SALES DEPT. MACHINE | config_alias_0001 |
| MFP_xxx_002 | ACCOUNTING DEPT. MACHINE | config_alias_0002 |

```
<ScannedDocuments>
<UserName>TARO</UserName>
<ScannedDateTime>31-12-2004 13:33:20</ScannedDateTime>
<NumberOfFiles>5</NumberOfFiles>
<SelectedForm>
<FormName>PERSONAL LOAN APPLICATION FORM</FormName>
<FormId>loan_xxx_yyy_001</FormId>
</SelectedForm>
<ScanSettings>
<Size>Auto</Size>
<Side>Double-sided</Side>
<Resolution>300</Resolution>
</ScanSettings>
    ⋮
    ⋮
</ScannedDocuments>
```

| RECEIVER FAX NUMBER | FORM TYPE ID |
|---|---|
| 03-5555-xxxx | loan_xxx_yyy_001 |
| 03-5555-yyyy | addr_xxx_yyy_002 |

```
<FAXDocuments>
<From>045-8888-xxxx</From>
<To>03-5555-yyyy</To>
<ReceivedDateTime>28-10-2004 13:33:20</ReceivedDateTime>
<NumberOfFiles>3</NumberOfFiles>
    ⋮
</FAXDocuments>
```

2000

DATA PROCESSING APPARATUS, IMAGE PROCESSING APPARATUS, DATA PROCESSING METHOD, IMAGE PROCESSING METHOD, AND PROGRAMS FOR IMPLEMENTING THE METHODS

BACKGROUND OF THE INVENTION

1. Field of the Invention

The present invention relates to a data processing apparatus, an image processing apparatus, a data processing method, an image processing method, and programs for implementing the methods suitable for converting images produced by scanning paper forms using a scanning device and/or documents received by a facsimile (hereinafter simply "fax") machine into electronic forms.

2. Description of the Related Art

Conventionally, in the most common method of converting paper forms into electronic forms, a scanning device scans the paper forms to thereby obtain image data thereof, and transmits the obtained image data to a computer in which the image data is processed into electronic form.

Conventionally, there have been known methods of identifying a form type of image data obtained from a form, in which the form type is identified via a comparison with form types registered in advance using pattern matching of images or the like, or via recognition of a barcode embedded beforehand in a portion of the form so as to be recognizable from image data of the form. Since the business process carried out subsequent to the identification of the form type differs depending on the form type, it is important to correctly sort image data according to form type.

As for the form recognition, a method of extracting a characteristic amount from image data of a form and calculating a degree of similarity of the form to a registered form has been conventionally proposed (see for example Japanese Laid-Open Patent Publication (Kokai) Nos. 2000-285187 and 2000-293596).

However, there is a problem that the conventional form type identifying methods do not have high recognition accuracy so that depending on the quality of image data obtained by scanning, the form type may be erroneously recognized as a similar but different form type or on occasion may be recognized as an unclear form.

Out of the conventional form type identifying methods, the method in which barcodes are used has a premise of using barcodes, and since time and effort are required to newly provide forms with embedded barcodes, there is a problem of not necessarily being able to satisfy user demands for the electronization of existing paper forms.

In addition, according to the conventional form type identifying methods, since a computer receives image data obtained by scanning a form from a scanner and then carries out an identifying process for the form type, there is a problem that the processing load of the computer is large.

SUMMARY OF THE INVENTION

It is an object of the present invention to provide a data processing apparatus, an image processing apparatus, a data processing method, and an image processing method, that are capable of reducing a load of a form type identifying process carried out by the data processing apparatus, enable image data to be correctly sorted according to form type, and are thereby capable of improving the accuracy with which form types can be identified, and programs for implementing the methods.

To attain the above object, in a first aspect of the present invention, there is provided a data processing apparatus comprising an image input unit that inputs image information of a form, to which form type information is attached, a character recognizing unit that carries out a character recognition process on the image information inputted by the image input unit based on the attached form type information, and a storage unit that stores the image information and a result obtained in the character recognition process by the character recognizing unit.

According to the present invention, it is possible to make a form type identifying process unnecessary for a data processing apparatus to which image data is transferred and therefore the load of the data processing apparatus can be reduced.

Preferably, the data processing apparatus further comprises a form recognizing unit that carries out a form recognition process on the image information inputted by the image input unit to obtain a form type, and a form type determining unit that determines whether the form type obtained by the form recognition process carried out by the form recognizing unit and a form type represented by the form type information inputted by the image input unit match, and the character recognizing unit carries out the character recognition process when the form type determining unit has determined that the form type obtained by the form recognizing unit and the form type represented by the form type information match.

More preferably, the data processing apparatus further comprises a form type input unit operable when the form type determining unit has determined that the form type obtained by the form recognizing unit and the form type represented by the form type information do not match and then one of these form types has been selected, to input the selected form type.

More preferably, the data processing apparatus further comprises a check unit that checks whether to carry out the determination by the form type determining unit, wherein when it is determined that the determination by the form type determining unit is to be carried out, the form recognizing unit carries out the form recognition process and the form type determining unit carries out the determination.

To attain the above object, in a second aspect of the present invention, there is provided an image processing apparatus designed for connection with a data processing apparatus comprising a display unit that displays a setting screen for setting form type information of a form, a reading unit that reads an image of the form to obtain image information of the form, and a transmitting unit that attaches the form type information set via the setting screen displayed by the display unit to the image information obtained by the reading unit and transmits the image information attached with the form type information to the data processing apparatus.

Preferably, the image processing apparatus further comprises an acquiring unit that acquires configuration information for the setting screen, the configuration information including read setting information for the reading unit, the read setting information corresponding to a form type represented by the form type information.

To attain the above object, in a third aspect of the present invention, there is provided a data processing method comprising an image input step of inputting image information of a form, to which form type information is attached, a character recognizing step of carrying out a character recognition process on the image information inputted in the image input step based on the attached form type information, and a storing step of storing the image information and a result obtained in the character recognition process in the character recognizing step.

Preferably, the data processing method further comprises a form recognizing step of carrying out a form recognition process on the image information inputted in the image input step to obtain a form type, and a form type determining step of determining whether the form type obtained in the form recognition process carried out in the form recognizing step and a form type represented by the form type information inputted in the image input step match, wherein the character recognition process is carried out in the character recognizing step when it has been determined in the form type determining step that the form type obtained in the form recognizing step and the form type represented by the form type information match.

More preferably, the data processing method further comprises a form type input step of inputting a selected form type, when it has been determined in the form type determining step that the form type obtained in the form recognizing step and the form type represented by the form type information do not match and then one of these form types has been selected.

More preferably, the data processing method further comprises a check step of checking whether to carry out the determination in the form type determining step, wherein when it is determined that the determination in the form type determining step is to be carried out, the form recognition process is carried out in the form recognizing step and the determination is carried out in the form type determining step.

To attain the above object, in a forth aspect of the present invention, there is provided an image processing method comprising a display step of displaying a setting screen for setting form type information of a form, a reading step of reading an image of the form to obtain image information of the form, and a transmission step of attaching the form type information set via the setting screen displayed in the display step to the image information obtained in the reading step and transmitting the image information attached with the form type information to a data processing apparatus.

Preferably, the image processing method further comprises an acquiring step of acquiring configuration information for the setting screen, the configuration information including read setting information for use in the reading step, the read setting information corresponding to a form type represented by the form type information.

To attain the above object, in a fifth aspect of the present invention, there is provided a program for causing a computer to implement a data processing method comprising an image input module for inputting image information of a form, to which form type information is attached, a character recognizing module for carrying out a character recognition process on the image information inputted by the image input module based on the attached form type information, and a storage module for storing the image information and a result obtained in the character recognition process by the character recognizing module.

Preferably, the program further comprises a form recognizing module for carrying out a form recognition process on the image information inputted by the image input module to obtain a form type, and a form type determining module for determining whether the form type obtained by the form recognition process carried out by the form recognizing module and a form type represented by the form type information inputted by the image input module match, wherein the character recognizing module carries out the character recognition process when the form type determining module has determined that the form type obtained by the form recognizing module and the form type represented by the form type information match.

More preferably, the program further comprises a form type input module operable when the form type determining module has determined that the form type obtained by the form recognizing module and the form type represented by the form type information do not match and then one of these form types has been selected, to input the selected form type.

More preferably, the program further comprises a check module for checking whether to carry out the determination by the form type determining module, wherein when it is determined that the determination by the form type determining module is to be carried out, the form recognizing module carries out the form recognition process and the form type determining module carries out the determination.

To attain the above object, in a sixth aspect of the present invention, there is provided a program for causing a computer to implement an image processing method comprising a display module for displaying a setting screen for setting form type information of a form, a reading module for reading an image of the form to obtain image information of the form, and a transmitting module for attaching the form type information set via the setting screen displayed by the display module to the image information obtained by the reading module and transmitting the image information attached with the form type information to a data processing apparatus.

Preferably, the program further comprises an acquiring module for acquiring configuration information for the setting screen, the configuration information including read setting information for the reading module, the read setting information corresponding to a form type represented by the form type information.

The above and other objects, features, and advantages of the invention will become more apparent from the following detailed description taken in conjunction with the accompanying drawings.

BRIEF DESCRIPTION OF THE DRAWINGS

FIG. 9 is a diagram showing one example where part of a UI configuration file that is downloaded to the MFP in the communication process shown in FIG. 8 is written in XML;

FIG. 10 is a diagram showing an example content of data stored in a storage device used by the server computer appearing in FIG. 1, where the data content is expressed in table format;

FIG. 12 is a view showing a screen for editing the UI construction using the client PC appearing in FIG. 1;

FIG. 14 is a diagram showing an example of a content of data expressed in table format and stored in the storage device used by the server computer appearing in FIG. 1;

FIG. 15 is a diagram showing one example where part of an additional information file uploaded to the server computer during the communication process shown in FIG. 8 is written in XML;

FIG. 20 is a diagram showing an example where an additional information file uploaded to the server computer in the communication process shown in FIG. 16 is written in XML.

DETAILED DESCRIPTION OF THE PREFERRED EMBODIMENTS

The present invention will now be described in detail with reference to the drawings showing preferred embodiments thereof.

Figure 1:
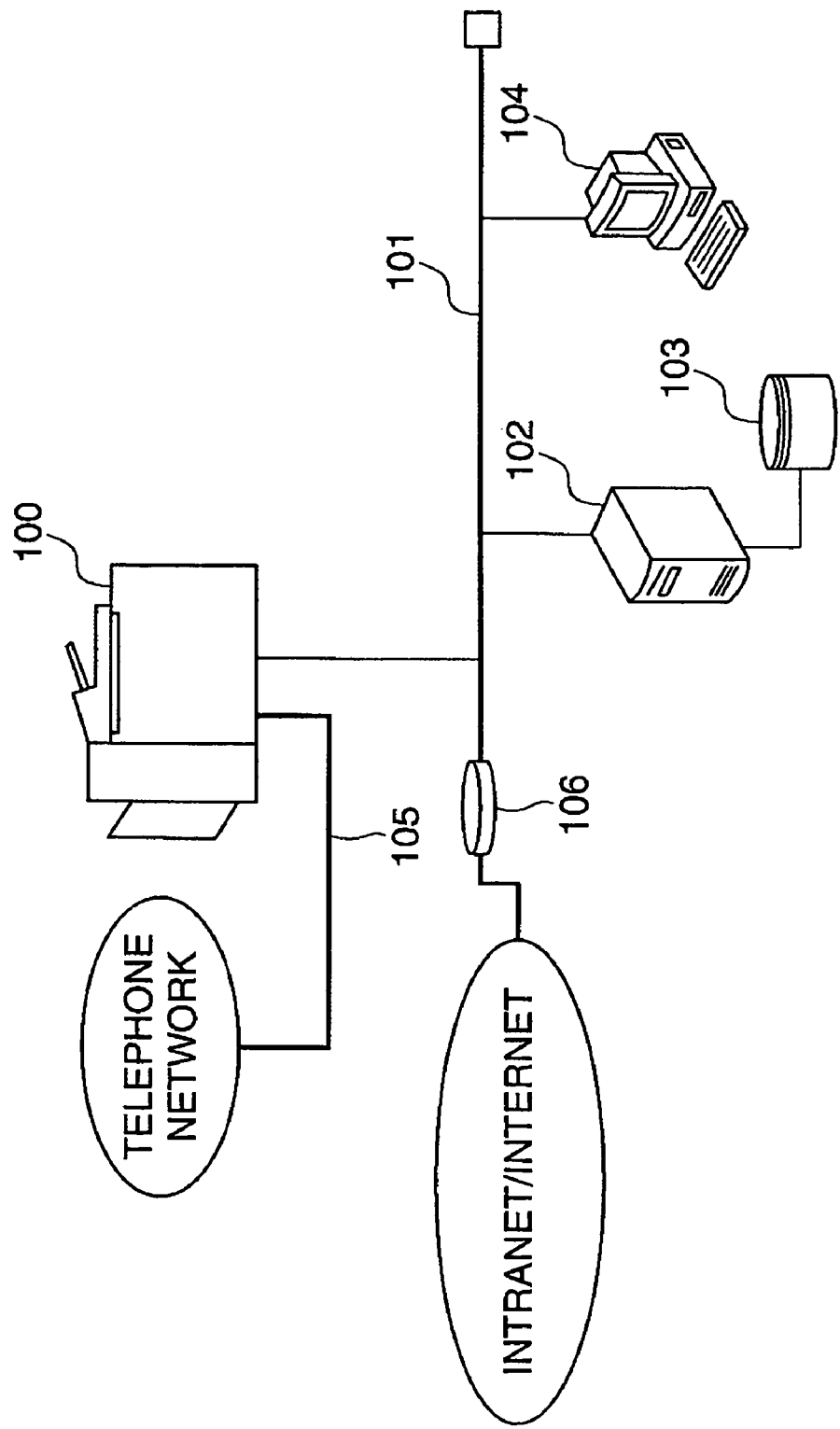
FIG. 1 is a diagram schematically showing an example construction of a network system including an image processing apparatus according to an embodiment of the present invention.

FIG. 1 is a diagram schematically showing an example construction of a network system including an image processing apparatus according to an embodiment of the present invention.

In FIG. 1, the network system is comprised of a multifunction peripheral (hereinafter simply "MFP") 100 as the image processing apparatus, a logical network 101, a server computer 102, a storage device 103, a client personal computer (hereinafter simply "client PC") 104, a telephone/fax line 105, and a gateway device 106. The logical network 101 is capable of connecting via the gateway device 106 to an intranet or the Internet. Note that although the case where a single MFP is provided is illustrated in FIG. 1, a plurality of MFPs may be provided.

The MFP 100 is a multifunction device with a plurality of functions such as an image reading function, an image forming function, and a communication function. The server computer 102 is a computer on which a program runs that controls communication between the server computer and the MFP 100 and a program runs that is used for processing business forms. The storage device 103 is constructed as a database system and a file storage system used by the server computer 102. The client PC 104 is a computer that connects to the server computer 102 to enable the user to carry out processing therethrough.

Figure 2:
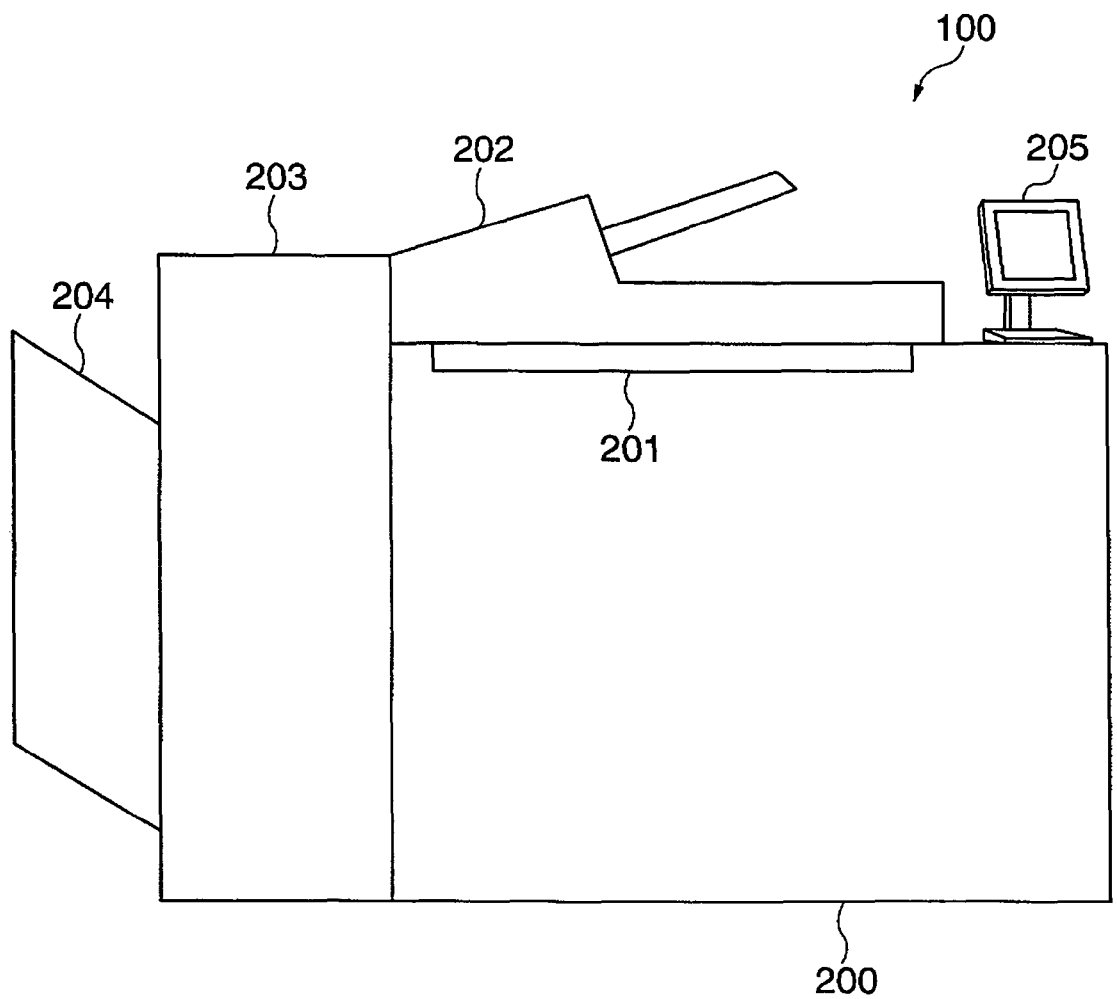
FIG. 2 is a view showing the external appearance of the MFP appearing in FIG. 1.

FIG. 2 is a view showing the external appearance of the MFP 100 appearing in FIG. 1.

In FIG. 2, the MFP 100 is comprised of an MFP main body 200, an original scanning section 201, an automatic original feeding section (hereinafter simply "feeder") 202, an output finishing section (hereinafter simply "finisher") 203, an output tray section 204, and a display/touch panel section 205.

The MFP main body 200 is comprised of a sheet-feeding cassette that stores sheets, a conveying section that conveys a sheet, a printer section that forms an image on the sheet, and the like. The original scanning section 201 scans an original fed to a reading position to read an image of the original. The feeder 202 feeds an original to the reading position. The finisher 203 carries out preset post-processing on a sheet that has been discharged from the MFP main body 200 and on which image formation has been completed. The output tray section 204 includes a plurality of trays that sort and stack sheets that have been subjected to the post-processing by the finisher 203. The display/touch panel section 205 includes a display that displays various screens and a touch panel for making various settings.

Figure 3:
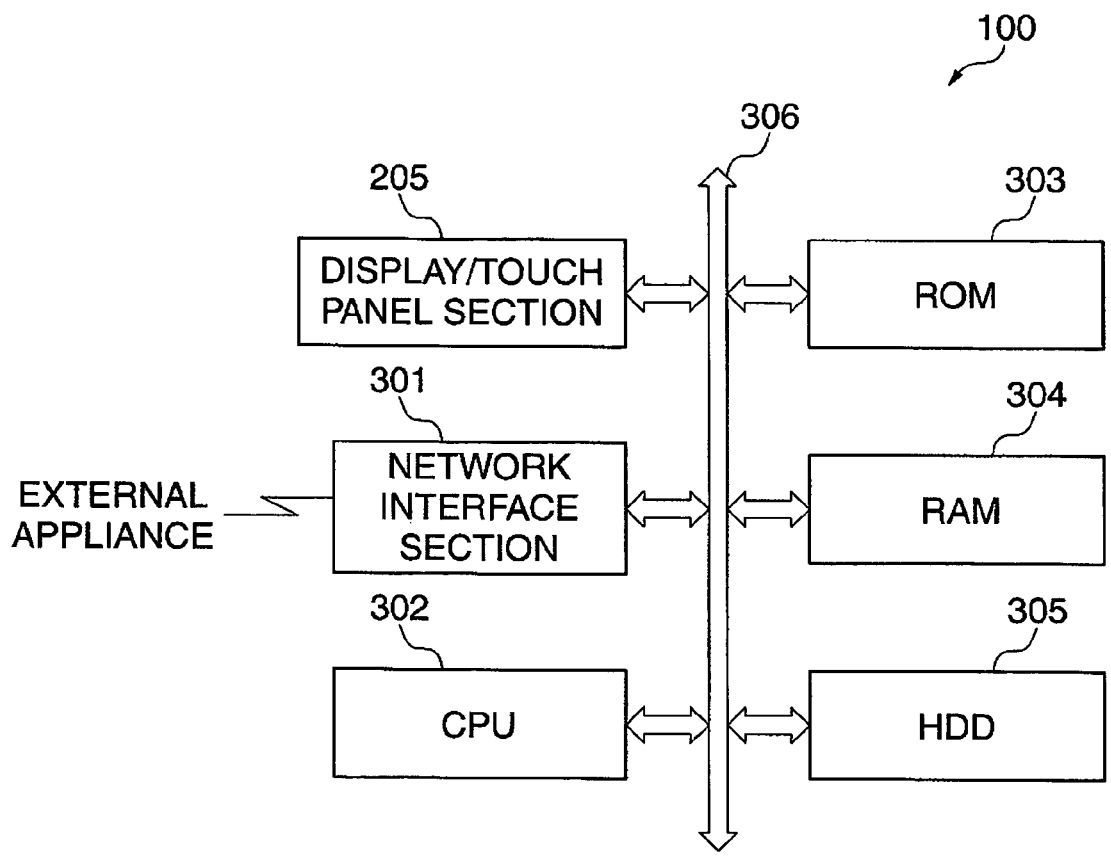
FIG. 3 is a block diagram showing the logical construction of an information processing function of the MFP shown in FIG. 2.

FIG. 3 is a block diagram showing the logical construction of an information processing function of the MFP 100.

As shown in FIG. 3, the MFP 100 is comprised of the display/touch panel section 205, a network interface section 301, a CPU 302, a ROM 303, a RAM 304, a hard disk drive (hereinafter "HDD") 305, and an input/output interface 306.

These sections are connected to one another via the input/output interface 306. The display/touch panel section 205 provides the user with a user interface. The network interface section 301 carries out communication with external appliances via the network 101. The CPU 302 controls the various sections of the MFP 100 and executes processing on the MFP side shown in FIG. 8 based on a control program stored in the ROM 303. The ROM 303 stores the control program and data. The RAM 304 is used as a temporary storage area and a work area. The HDD 305 has a large-capacity storage region and stores various types of data.

Figure 4:
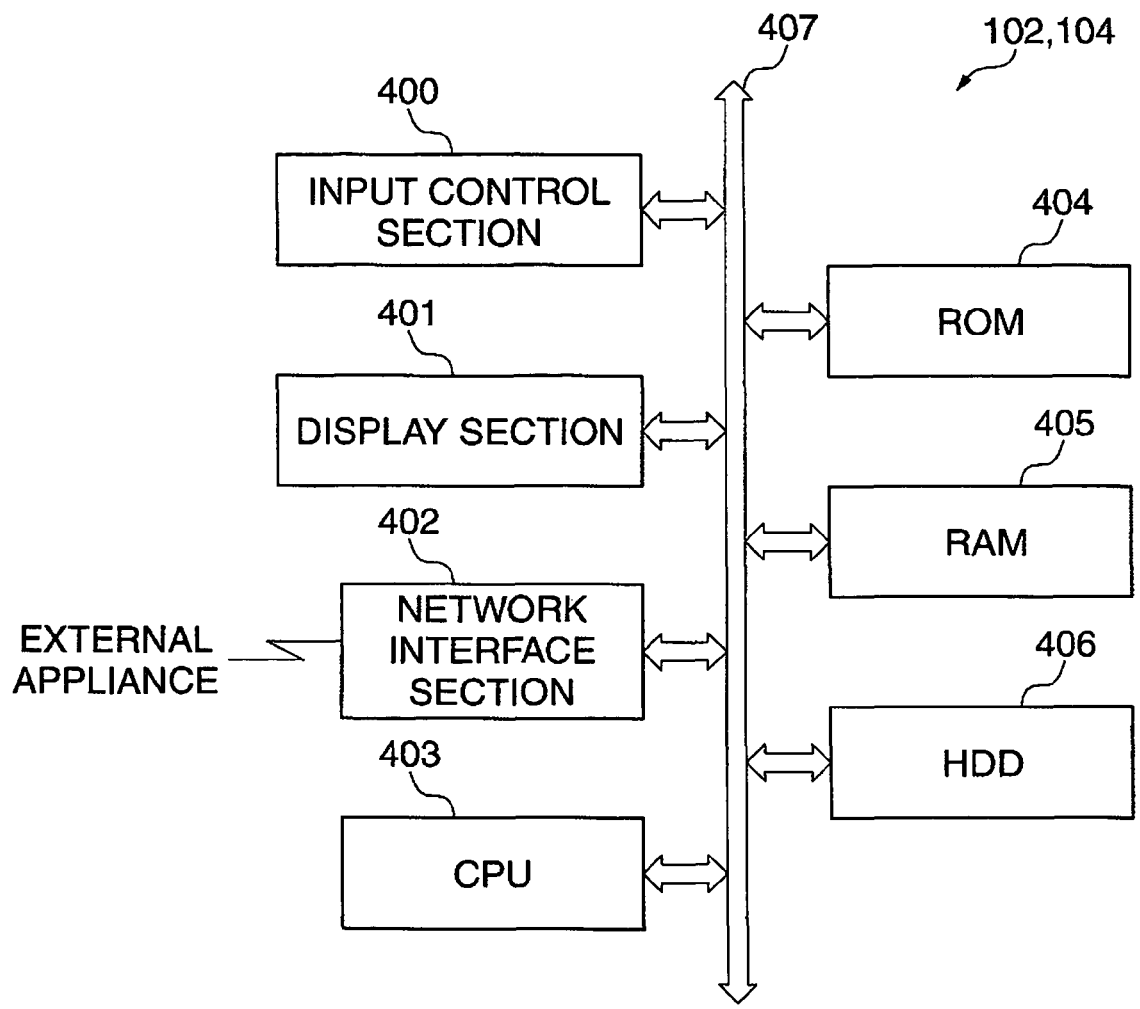
FIG. 4 is a block diagram showing the logical construction of an information processing function of each of a server computer and a client PC appearing in FIG. 1.

FIG. 4 is a block diagram showing the logical construction of the information processing function of each of the server computer 102 used as a data processing apparatus and the client PC 104.

As shown in FIG. 4, each computer includes an input control section 400, a display section 401, a network interface section 402, a CPU 403, a ROM 404, a RAM 405, an HDD 406, and an input/output interface 407.

These sections are connected via the input/output interface 407. The input control section 400 controls a keyboard/mouse that receives an input from a user. The display section 401 provides an output screen to the user. The network interface section 402 carries out communication with an external appliance via the network 101. The CPU 403 is in charge of control of various sections of the computer, and when the computer in question is the server computer 102, the CPU 403 executes processing on the server computer side shown in FIG. 8 based on a control program stored in the ROM 404. The ROM 404 stores the control program and data. The RAM 405 is used as a temporary storage area and a work area. The HDD 406 has a large-capacity storage region and stores various types of data.

Figure 5:
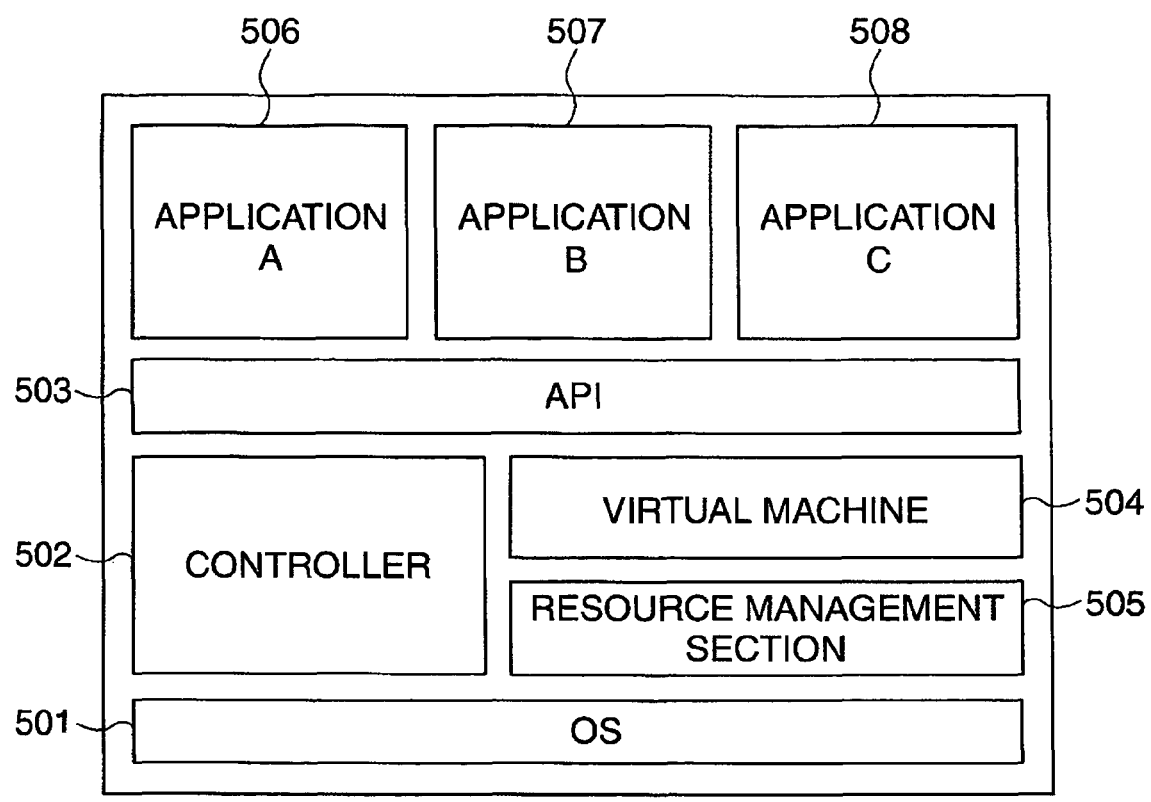
FIG. 5 is a block diagram showing the configuration of software that is capable of executing customizable application programs in the MFP shown in FIG. 2.

FIG. 5 is a block diagram showing the configuration of software that is capable of executing customizable application programs (hereinafter simply "applications") in the MFP 100.

In FIG. 5, reference numeral 501 designates one example of an execution environment that controls the MFP 100. In general, the execution environment 501 includes modules of a real-time OS that can control the various functions of the MFP 100 in real time, or a group of libraries capable of critically controlling the respective functions of the MFP 100 including the functions of optional devices and expansion cards by instructing the CPU 302 of the MFP 100. The execution environment (real time OS) 501 is realized by a group of modules that provide interface commands to applications that run at a higher level.

Reference numeral 502 designates a controller (control section) that runs on the execution environment 501 and is comprised of modules for controlling the original scanning section 201, a printer section, a modem communication section, a PDL (Page Description Language) expansion section and the like of the MFP 100. Reference numeral 503 designates an application programming interface (hereinafter "API") including a function for accessing the controller 502 from the API 503 in response to instructions inputted from an application and a function for controlling the network interface section 301.

Reference numeral 504 designates an optimal execution environment for executing a specified application. The optimal execution environment is realized, for example, by a JAVA (registered trademark) virtual machine, and is capable of executing the specified application with no dependency on the OS, the device environment, or the like. Reference numeral 505 designates a resource management section that manages resources used by the execution environment 504 and runs on the real time OS 501. When the virtual machine that realizes the execution environment 504, the API 503, or every application on the real time OS 501 uses resources such as memory, the resource management section 505 limits such use so that only resources decided in advance can be used. Reference numerals 506, 507, and 508 designate examples of applications that can run on the MFP 100.

Figure 6:
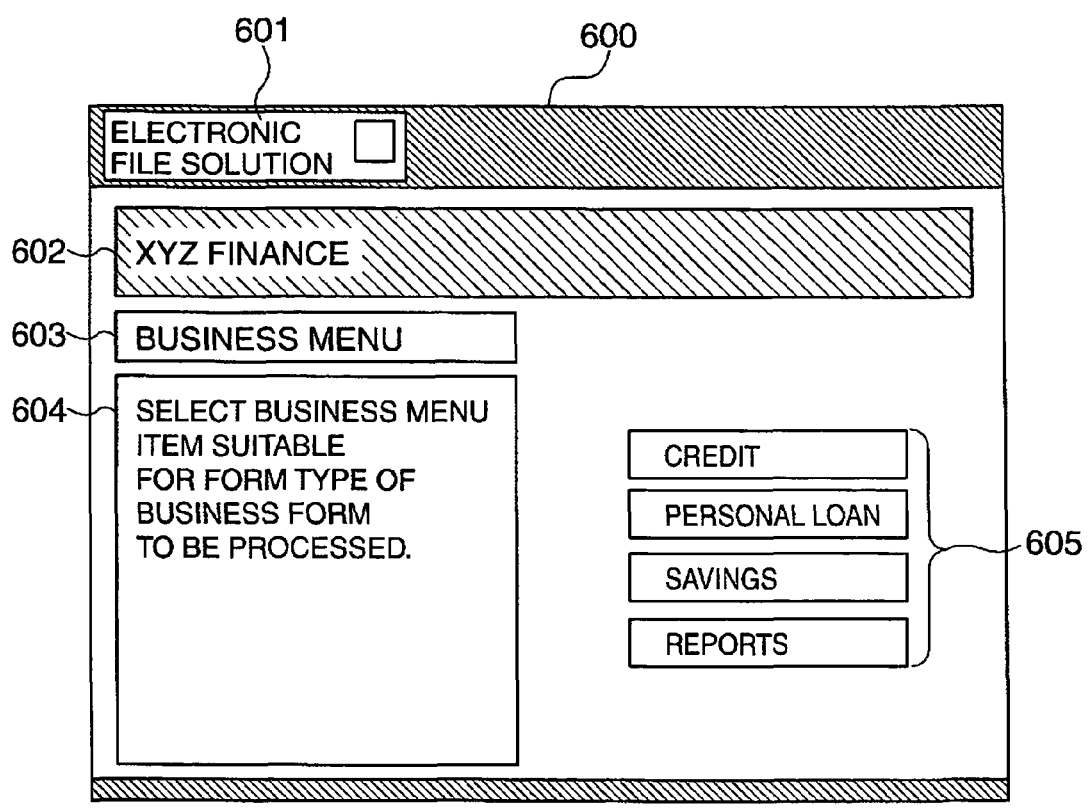
FIG. 6 is a view showing one example of an application UI of the MFP shown in FIG. 2.

FIG. 6 is a view showing one example of an application UI (user interface) 600.

In FIG. 6, the UI 600 is customizable and is displayed on the display/touch panel section 205 of the MFP 100. The UI 600 is prepared for each individual of or common to one or a plurality of applications that run on the execution environment 504, such as the application 506 appearing in FIG. 5. When the execution environment 504 is a JAVA (registered trademark) virtual machine, the one or more applications are each provided by a JAVA program.

The application concerned can access various resources from the display/touch panel section 205 to the HDD 305 of the MFP 100, and sends control instructions to the controller 502 via the API 503, thereby controlling the original scanning section 201, the printer section, the modem communication section, the PDL expansion section, or the like of the MFP 100. The application can also communicate with the server computer 102 via the network interface section 301.

The UI 600 in FIG. 6 shows an example where the application has been customized in accordance with the business content of a financial company called "XYZ Finance". Reference numeral 601 designates a name/icon display tab of the application, 602 a logo image of the user enterprise, 603 a title of an operation screen (for example, "business menu"), 604 a message displayed to the user (for example, "Select a business menu item suitable for the type of a business form to be processed."), and 605 business process selection buttons (button controls) capable of selecting a business menu item corresponding to a business process desired by the user (for example, "credit", "personal loan", "savings", or "reports").

Figure 7:
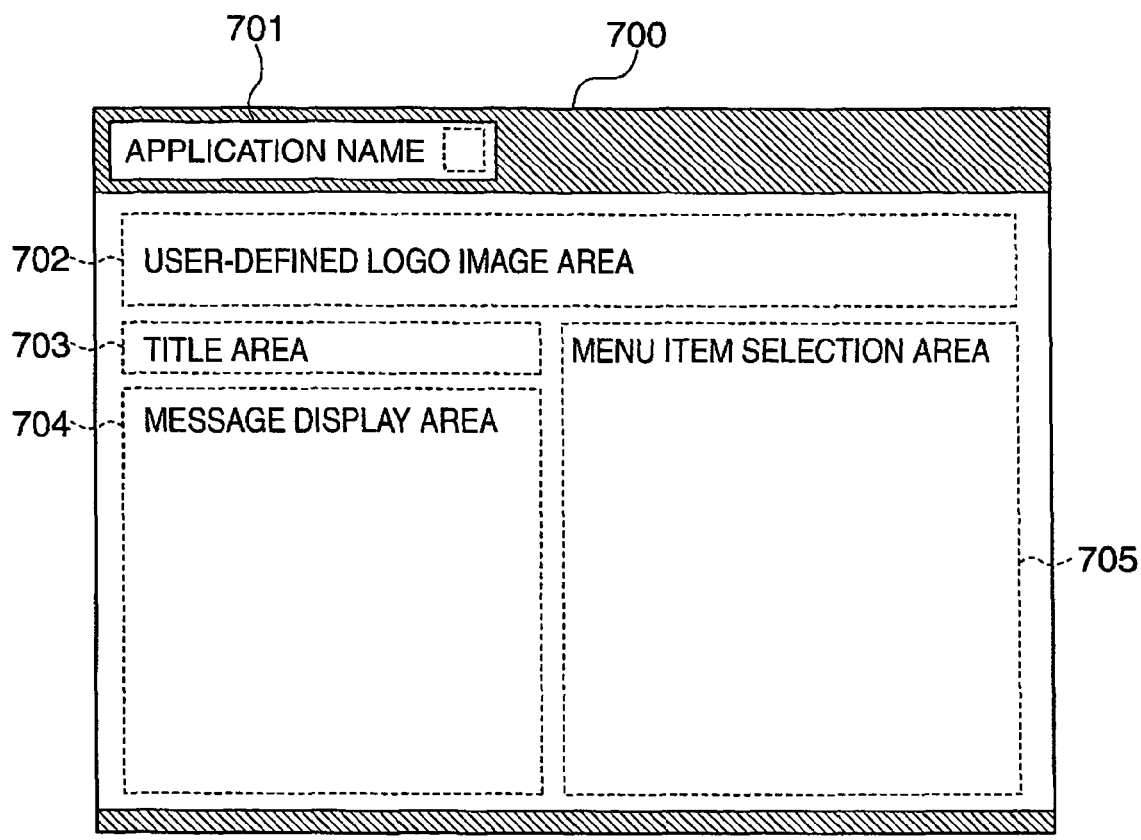
FIG. 7 is a view showing one example of a UI construction template for an application associated with the application UI of FIG. 6.

FIG. 7 is a view showing one example of a UI construction template 700 for the application associated with the UI 600 of FIG. 6.

In FIG. 7, reference numeral 701 designates an application name/icon display area, 702 a user-defined logo image area, 703 a title area, 704 a message display area, and 705 a menu item selection area. In accordance with the business content corresponding to business form processing carried out by the user, an application installed in the MFP 100 may download UI components (a UI configuration file and UI contents) from the server computer 102 as appropriate and arrange such components in accordance with settings in a UI construction template 700, to thereby change the UI construction.

Figure 8:
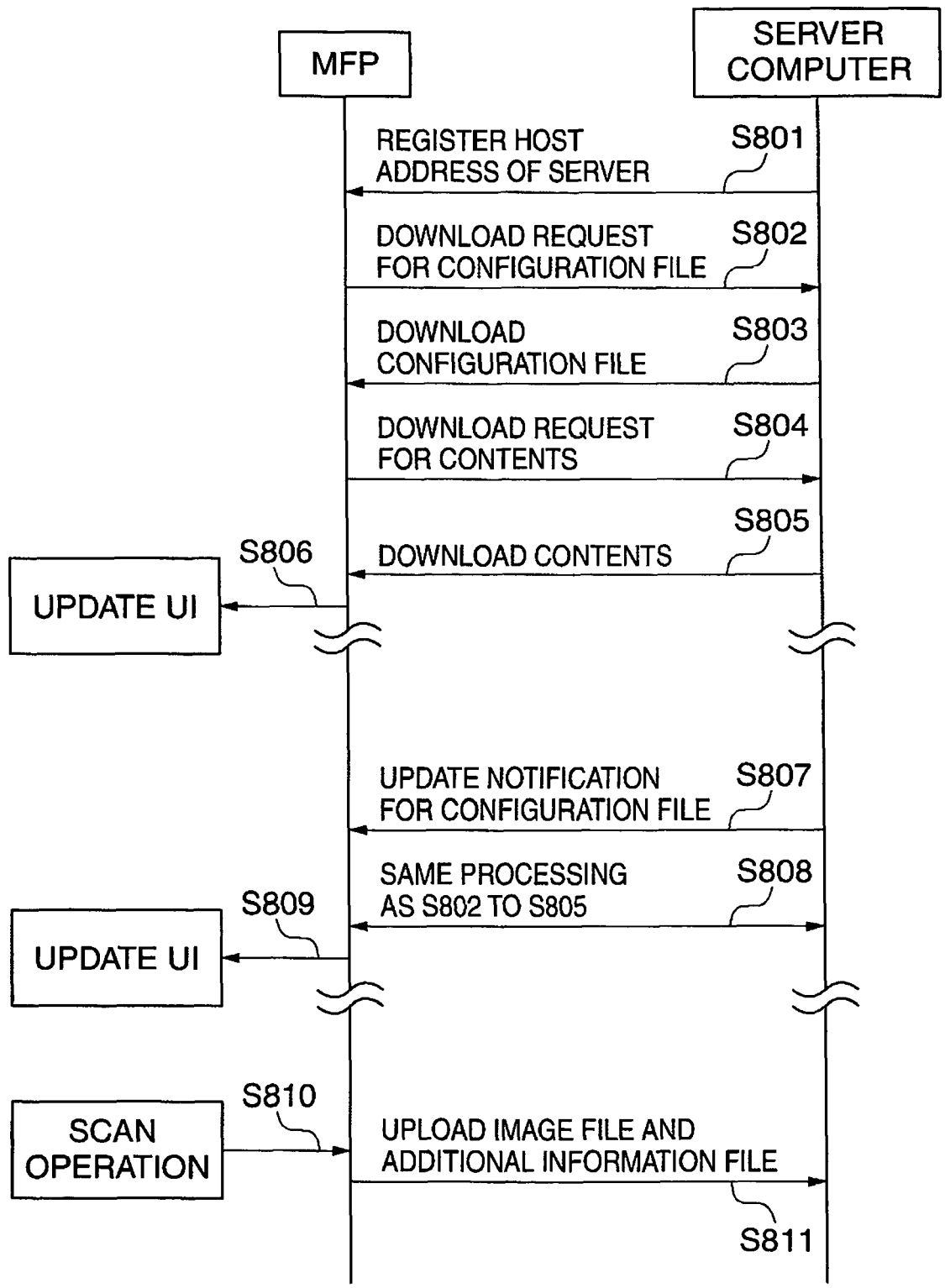
FIG. 8 is a diagram showing a communication process carried out between the MFP and the server computer appearing in FIG. 1 when the UI construction for an application is updated.

FIG. 8 is a diagram showing a communication process carried out between the MFP 100 and the server computer 102 when the UI construction for an application is renewed.

In FIG. 8, upon only the initial operation performed after an application associated with the UI 600 is installed in the MFP 100, the MFP 100 on the network is automatically detected by the server computer 102 or is detected by an operator manually operating the server computer 102. The CPU 403 of the server computer 102 registers a host address of the server computer 102 in the application installed in the MFP 100 (step S801). Note that this operation may be carried out via the display section 401 of the client PC 104 or the display/touch panel section 205 of the MFP 100.

The application installed in the MFP 100 designates the registered host address and transmits a download request for a UI configuration file concerned to the server computer 102 (step S802). The CPU 403 of the server computer 102 transmits the configuration file to the MFP 100 in response to the download request (step S803).

FIG. 9 is a diagram showing one example of part of a UI configuration file written in XML (Extensible Markup Language).

The configuration file 900 partly shown in FIG. 9 includes area information (positions/sizes) that is construction information of the UI construction template 700 for the corresponding application installed in the MFP 100, area attribute information (types of character strings, images, and controls to be displayed in the respective areas 701 to 705 appearing in FIG. 7), information on the character strings, images and controls (arrangement of button controls and expression of a menu hierarchy), a list of form type information to be handled by the application (form type IDs, form names, numbers of pages in respective forms), and scan setting information according to form type (a designation of single-sided or double-sided scanning, resolution, color/monochrome, sheet size, and the like).

In the example shown in FIG. 9, in the element "MenuItem", a menu item name "personal loan" is stored in the element "Name", a message "It is necessary . . . " to be displayed is stored in the element "Message", and the form type ID "loan_xxx_yyy_001" is stored in the element "FormId". After being downloaded to the MFP 100 from the server computer 102, this information is analyzed by the application of the MFP 100 and is used to construct the menu item "personal loan" that is part of the UI construction shown in FIG. 6.

Returning to FIG. 8, regarding UI contents such as image files not stored in the UI configuration file 900, the application of the MFP 100 can transmit a download request for the UI contents, which correspond to content ID information written in advance in the configuration file, to the server computer 102 (step S804) to individually download the UT contents from the server computer 102 to the MFP 100 (step S805). The application of the MFP 100 completes downloading the UI configuration file and UI contents from the server computer 102 and after it has been confirmed that the application is in a standby (idle) state, the UI is updated (step S806).

Here, the configuration file and contents described above are downloaded from the server computer 102 to the MFP 100 according to a Web service-based communication method. Although the present embodiment is described for the premise where the configuration file is in XML format, the configuration file may in reality be provided in any format, such as a text file, a binary file, or a data stream.

Next, the process carried out when changing the UI construction of an application of the MFP 100 at an arbitrary time will be described.

In FIG. 8, on the server computer 102, the user carries out a change operation for the UI construction of an application of an MFP, for example the MFP 100, and an update notification for the UI configuration file is transmitted from the server computer 102 to such MFP (step S807). The application of the MFP then downloads the UI configuration file and the UI contents from the server computer 102 in the same way as in the steps S802 to S805 described above.

Here, a time designation for a change in the UI construction is written in the configuration file described above. The application of the MFP caches the new construction information and when it is determined based on timer monitoring or the like that the designated time is reached the UI is updated after first confirming that the application is in the standby (idle) state (step S809). The time designation for the change in the UI construction can be set based on an instruction from the server computer 102 to immediately update the UI. Therefore, the UI construction can be changed by the MFP at a freely chosen time.

Next, a form scanning process that scans paper business forms to convert the same into electronic forms, which are then processed further, will be described.

In a step S810 shown in FIG. 8, the user sets an original business form on the feeder 202 of the MFP 100, operates the UI for the desired one of or common to the applications installed in the MFP 100 via the display/touch panel section 205 to select the menu item "personal loan", for example, out of the business process selection buttons 605, and operates a button control on the UI or hardware button on the MFP 100 to start the scanning of the original form (see also FIGS. 2 and 6). The original form is read by the original scanning section 201 of the MFP 100 and stored as an image file in the HDD 305. The application of the MFP 100 attaches an additional information file (exemplarily shown by reference numeral 1500 in FIG. 15) to the image file and uploads the image file attached with the additional information file to the server computer 102 (step S811).

Here, the image file to which the additional information file has been attached is transmitted from the MFP 100 to the server computer 102 according to a Web service-based communication method. Since client information may be included in the business form image depending on the content of the business process, in view of security, in the present embodiment it is possible to carry out encrypted communication as represented by SSL (Secure Sockets Layer).

FIG. 15 is a diagram showing one example where an uploaded additional information file 1500 is written in XML.

In FIG. 15, the user name of the user who carried out the scan operation is stored in the element "UserName", the date and time of scanning in the element "ScannedDateTime", a number of image files generated as a result of the scanning in the element "NumberOfFiles", the selected menu item name, i.e. form name in the element "FormName", and the selected form type ID in the element "FormId". The settings used when scanning was carried out are stored in the respective elements provided in the element "ScanSettings". The process described above may be carried out by a scanner driver installed in the MFP 100 or an image processing program.

In the present embodiment, the additional information file 1500 is prepared when one or more paper business forms are scanned by the MFP 100. It should be noted that most parts of the just-mentioned parameters for the preparation of the additional information file 1500 are automatically generated by the MFP 100 at the time of scanning, the remaining one or more parameters can be inputted by the operator manually operating the display/touch panel section 205 of the MFP 100, for instance, where required.

The menu item "personal loan" selected by the user on the UI shown in FIG. 6 and the form type ID "loan_xxx_yyy_001" associated with the menu item "personal loan" as described above for the example shown in FIG. 9 are stored by using the additional information file as shown in FIG. 15. Also, in the additional information file, it is possible to easily expand data fields required by the application of the MFP 100 and the server computer 102 so that any freely chosen expansion data can also be uploaded. Although the present embodiment is described for the premise where the additional information file is in XML format, the additional information file may be implemented in any format, such as a text file, a binary file, or a data stream.

Figure 18:
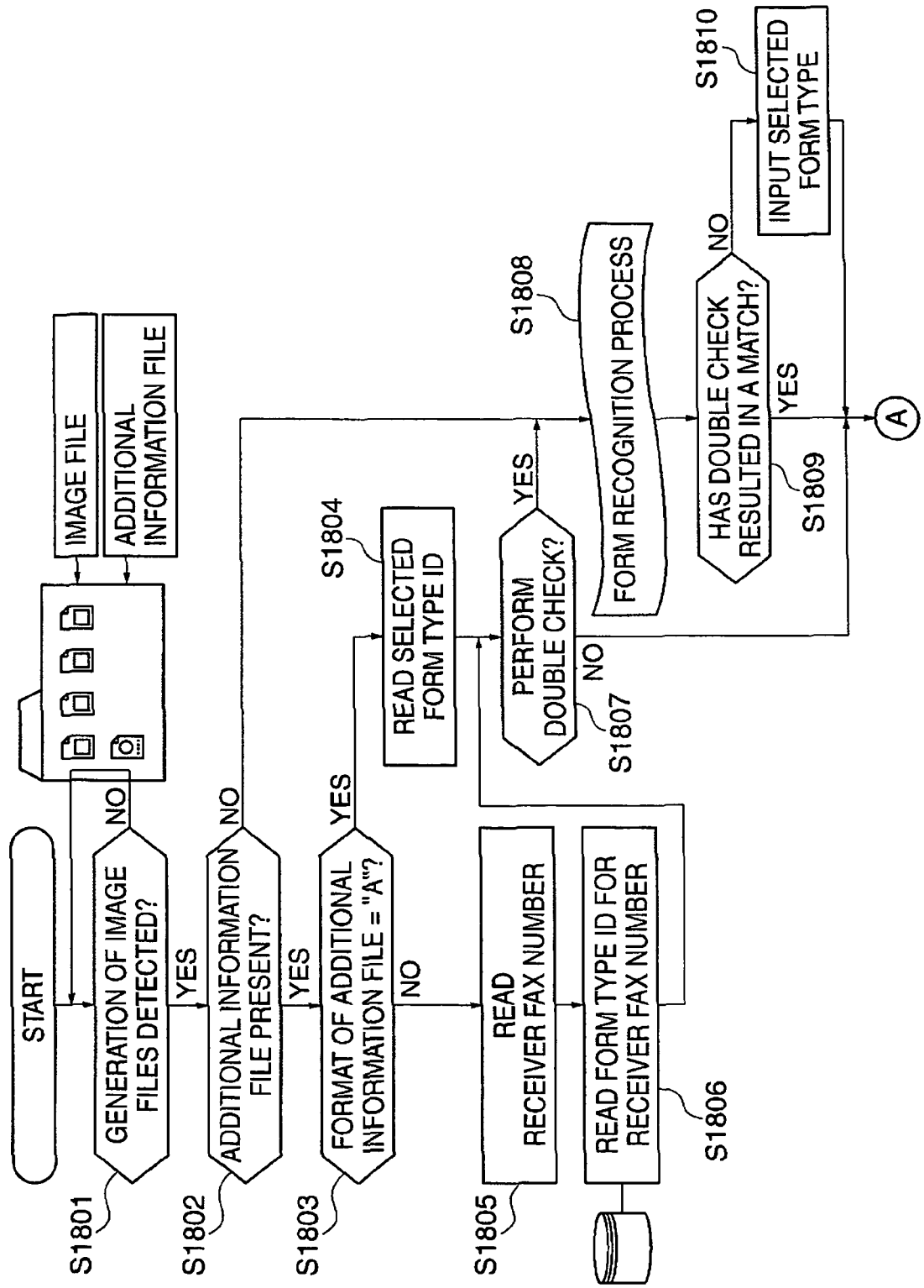
FIG. 18 is a flowchart showing the procedure whereby a program running on the server computer appearing in FIG. 1 processes an image file and an additional information file received from the MFP.
Figure 19:
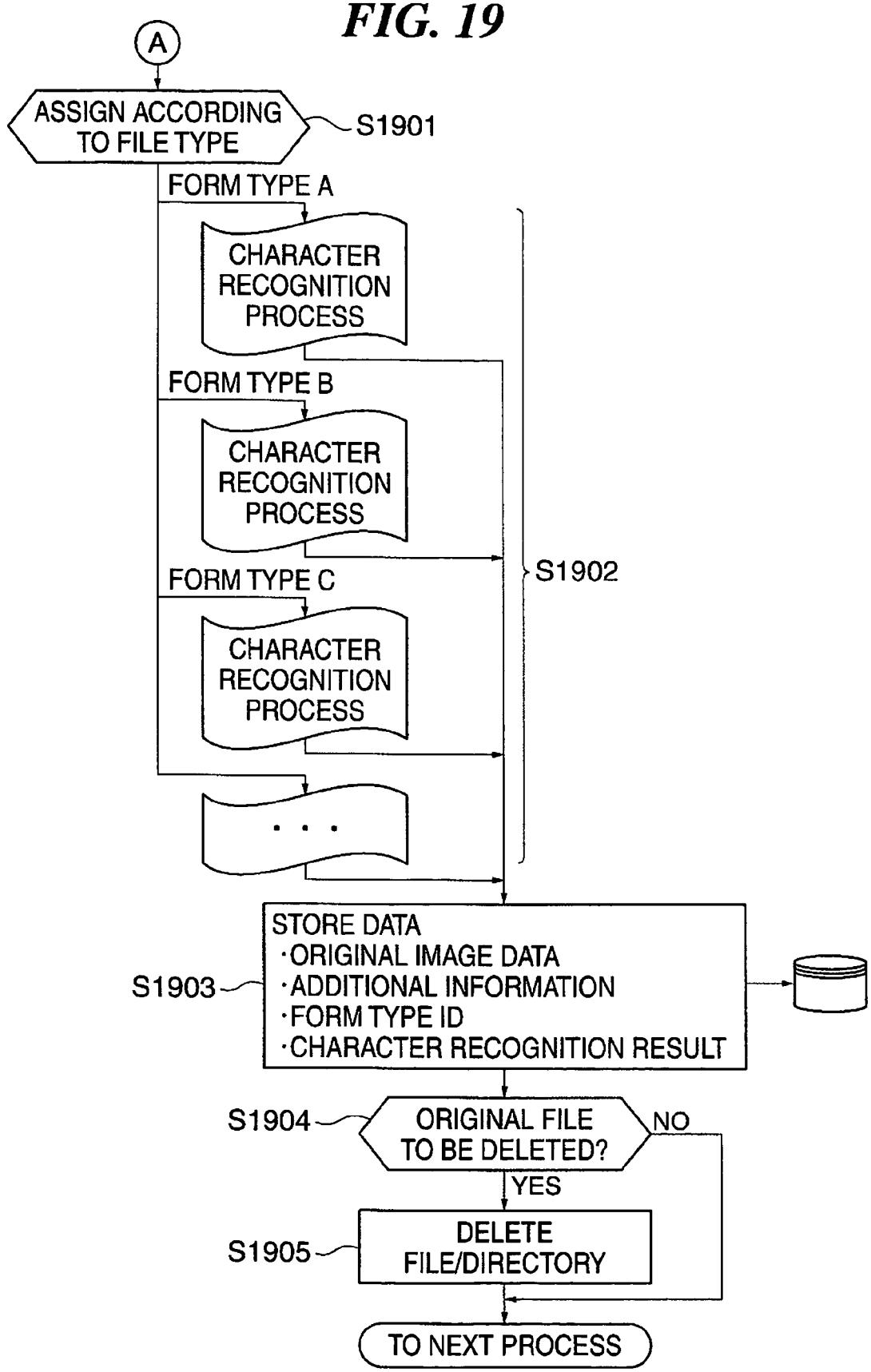
FIG. 19 is a continued part of the flowchart in FIG. 18.

FIGS. 18 and 19 are flowcharts showing the procedure whereby a program running on the server computer 102 processes the image file and additional information file received from the MFP 100.

Referring to FIGS. 18 and 19 explanations will be given of the case where the program running on the server computer 102 receives an upload of image files of forms scanned by the MFP 100, analyzes the additional information files attached to the image files to determine the form type IDs, and sorts the image files in advance into respective form types to select appropriate further processing for the image files.

According to the program that runs on the server computer 102, the CPU 403 of the server computer 102 monitors the generation of image files on a file system (step S1801). The program includes a form recognition processing function for image data and an information analyzing function for additional information files. As described in detail later, on detecting that an image file has been generated, the CPU 403 confirms whether or not an additional information file corresponding to the detected image file is present inside a folder in the file system (step S1802). When no additional information file is present, in the present embodiment, the CPU 403 obtains only the detected image file and proceeds to a form recognition process of a step S1808 for detecting the form type based on data of the image file. It should be noted that an error process may be made without performing the form recognition process, when no additional information file is attached to the image file. In the error process, an indication that no additional information file has been attached may be displayed, for instance.

When the corresponding additional information file is present, the CPU 403 identifies the file format of the additional information file (step S1803). When the additional information file has the file format shown in FIG. 15 (referred to here as "file format A"), the CPU 403 reads the form type ID from the additional information file (step S1804).

The CPU 403 determines whether or not the form type is to be double checked based on the form type extracted in the step S1804 and a form type to be detected via a form recognition process by the server computer 102 (step S1807). When the form type is to be double checked, the CPU 403 has the form type detected by the form recognition process by having a form recognition application execute predetermined form recognition logic (step S1808). The form recognition process in the step S1808 can be made in a conventional manner, for instance. Next, the CPU 403 determines whether or not the form type detected in the step S1804 and the form type detected by the form recognition process in the step S1808 described above, i.e. the results of the double check match (step S1809). When both form types do not match, the CPU 403 informs the user or operator via the display section 401 that the detection results do not match. In response to this, the operator selects the form type (step S1810). In a case where the form type associated with the image file attached with no additional information file is detected in the step S1808, the CPU 403 notifies the operator of the detected form type although an illustration is omitted in FIG. 18.

It should be noted that it is preferable that no double check be made to reduce a load of the server computer 102. In the present embodiment, however, the double check can selectively be made to improve the accuracy in the form type detection.

Since the form type of the received image file have been determined by the above processing, the CPU 403 assigns the image file to processing according to the form type (step S1901 in FIG. 19). Although a setting of character recognition areas in the business form or its image data and the like differs according to form type, the CPU 403 can properly carry out a character recognition process in accordance with the determined form type (step S1902), whereby characters described in the character recognition areas of the image file can properly be recognized, so that they are converted into electronic character information. When the character recognition process is complete, the CPU 403 stores the data handled or produced by the above processes, such as the original image data corresponding to the original image file detected in the step S1801, additional information, form type ID, and character recognition result for the image data, in the storage device 103 in such a manner that these data are made correspond to their form type (step S1903). By repeatedly executing the process shown in FIGS. 18 and 19, numerous pieces of data relating to various image files are sorted and stored in the storage device 103 according to form type.

After the data is stored, the CPU 403 determines whether or not the original image file detected in the step S1801 described above may be deleted (step S1904), and when the original file is to be deleted, the original file and the directory concerned are deleted from the file system (step S1905). After this, the data obtained by the process described above are subjected to subsequent processing in accordance with the business content or the business form processing.

FIG. 10 is a diagram showing an example content of data stored in the storage device 103 (a database system or file storage system) used by the server computer 102, where the data content is expressed in table format.

As shown in FIG. 10, for form management, the server computer 102 stores the correspondence between a form type ID 1001, a form type name 1002, and a form file 1003 in a storage table 1000 inside the storage device 103. By using the storage table 1000, it is possible to search for a name of a form shown by a form type ID and an original image file of the form.

When an image file of a form having any one of form type IDs for which character recognition areas have already been known is uploaded from the MFP 100, the form type identification or selection and the character recognition processing are carried out as shown in FIGS. 18 and 19, whereby the server computer 102 can start subsequent business processing such as form processing appropriately so as to conform to the identified or selected form type. Here, the expression "business processing" refers to processes such as starting a work flow (an arrangement that carries out business processing or business support on a computer where the flow of business is regulated), sending of electronic mail to which the form is attached, and transmitting the form data to a core business system, and can be defined by the user as appropriate in accordance with the business content.

Next, a method whereby the UI construction described above can be edited on the server computer 102 by operating the client PC 104 will be described.

Figure 11:
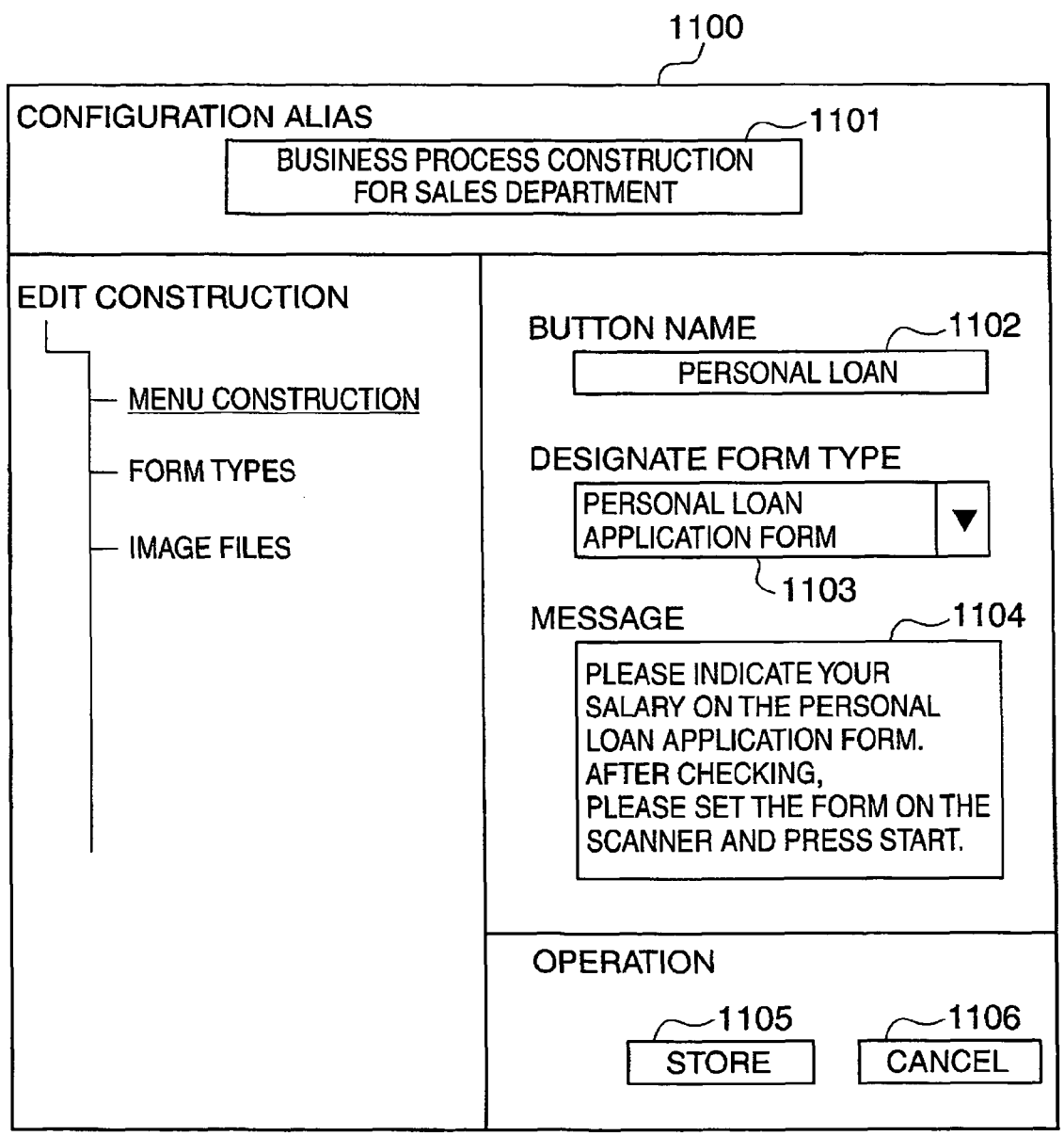
FIG. 11 is a view showing a screen for editing the UI construction using the client PC appearing in FIG. 1.
Figure 13:
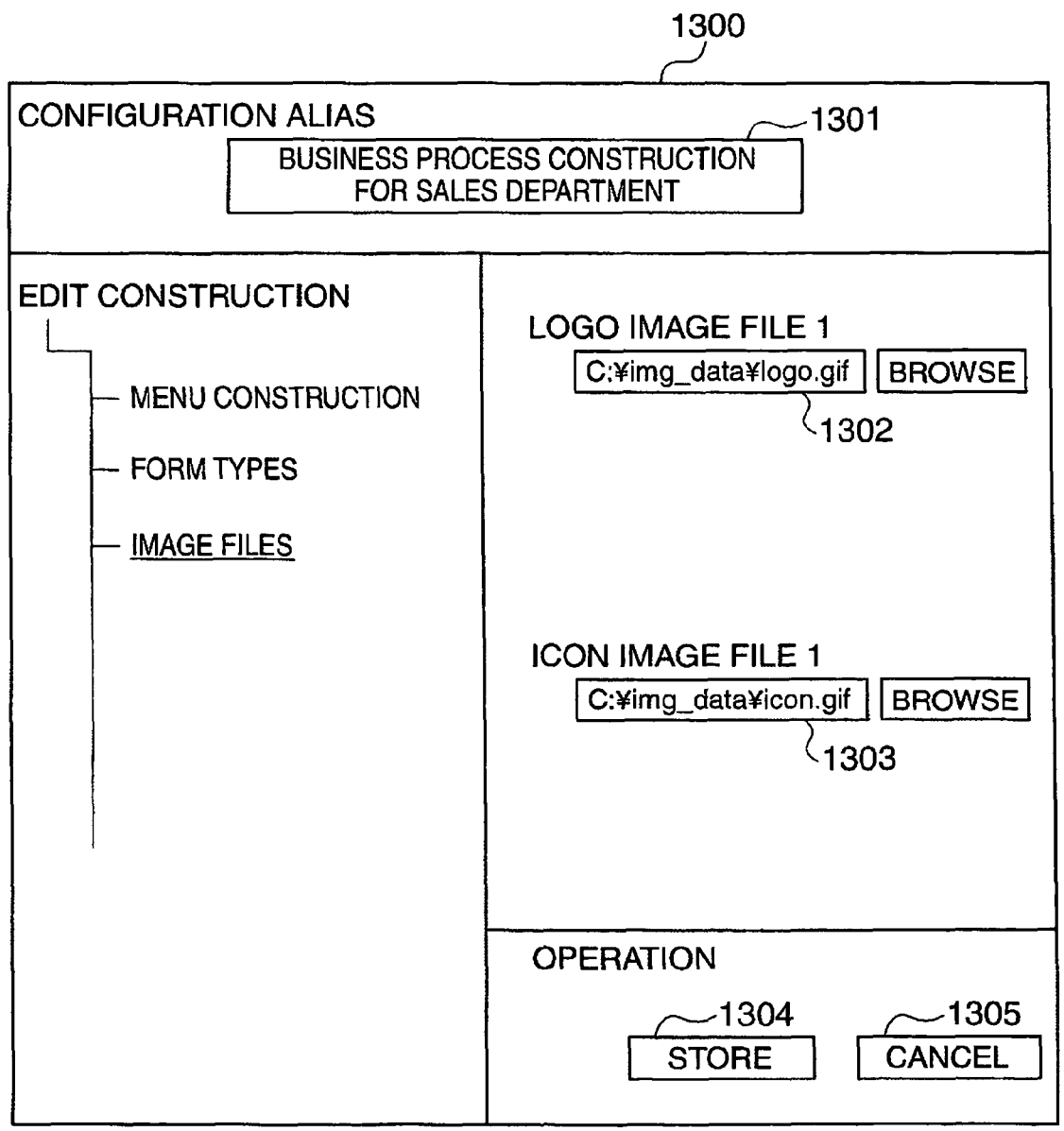
FIG. 13 is a view showing a screen for editing the UI construction using the client PC appearing in FIG. 1.

FIGS. 11 to 13 are views showing screens for editing the UI construction.

In FIG. 11, reference numeral 1100 designates one example of a UI construction editing screen displayed on the display section 401 of the client PC 104. When the user wishes to newly generate a UI construction in the UI construction editing screen 1100, the UI construction can be named with a configuration alias 1101. The UI construction editing screen 1100 shows an example where a button name 1102 is designated as "personal loan", and a form type 1103 is designated as "personal loan application form". Reference numeral 1105 in FIG. 11 designates a "store" button, and 1106 a "cancel" button.

By referring to the storage table 1000 of the storage device 103 of the server computer 102, the indication "personal loan application form" designated for the form type 1103 and matching the form type name "personal loan application form" and is made associated with the form type ID "loan_xxx_yyy_001". Hence the data value "personal loan application form" is set in the element "FormName" and the data value "loan_xxx_yyy_001" in the element "FormId", these elements being in the element "ScanForm" in the XML data shown in FIG. 9. A message that has been edited on a message area 1104 in the UI construction editing screen 1100 is set in the same way in the element "Message" in the XML data.

Similarly, in the UI construction editing screen 1200 in FIG. 12 and the UI construction editing screen 1300 in FIG. 13, it is possible to designate scan setting information, image files, and the like according to the form type. After this, the UI configuration file and UI contents are transmitted from the client PC 104 to the server computer 102 and stored in the server computer 102.

As described above, when there is a download request from the MFP 100, as shown in the steps S802 to S805 and also in the steps S807 to S808 in FIG. 8, the configuration file and contents stored in the server computer 102 are transmitted from the server computer 102 to the MFP 100.

In the UI construction editing screen 1200 shown in FIG. 12, it is possible to designated a form file for printing. In FIG. 12, reference numeral 1201 designates a configuration alias, 1202 a form type, 1203 scan settings (a designation of single-sided or double-sided scanning, resolution, and color/monochrome), 1204 a number of pages, 1205 information on the form file for printing, 1206 a "store" button, and 1207 a "cancel" button.

The screen 1200 is an example construction that uses the characteristics of the MFP 100 to make it possible via a customized UI to immediately print out a freely chosen form in accordance with a selected business content. For example, when a user who has selected the business process named "personal loan" wishes to print out a blank form used as a personal loan application form or wishes to print out a guide showing how to fill in the personal loan application form, such documents can be immediately printed out using the UI.

In the UI construction editing screen 1300 shown in FIG. 13, it is possible to designate a logo image file corresponding to a logo image 602 to be displayed in the user-defined logo image area 702 of the UI and an icon image file corresponding to an icon image displayed in an icon display area such as the name/icon display tab 601 of the UI. In FIG. 13, reference numeral 1301 designates a configuration alias, 1302 information on the logo image file, 1303 information on the icon image file, 1304 a "store" button, and 1305 a "cancel" button.

Next, a method of using different UI constructions for the UIs of different MFPs in the case where a plurality of MFPs are connected on the network system shown in FIG. 1 described above will be described.

FIG. 14 is a diagram showing one example of a content of data expressed in table format and stored in the storage device 103 for the server computer 102.

As shown in FIG. 14, for MFP management, the server computer 102 stores the correspondence between machine IDs 1401 uniquely assigned to the respective MFPs, MFP machine aliases 1402, and configuration alias IDs 1403 in a storage table 1400 inside the storage device 103. In a case where the storage table 1400 is managed at the server computer 102, machine IDs are transmitted from MFPs to the server computer 102 in the steps S802 and S808 in FIG. 8. The server computer 102 searches the storage table 1400 and transmits the configuration file and contents corresponding to appropriate configuration aliases to the respective MFPs separately.

By doing so, by having the plurality of MFPs use respectively different configuration aliases or the same configuration aliases, it is possible to have respective MFPs construct different UIs.

As described above, according to the present embodiment, by downloading UI components from the server computer 102 in accordance with the business content of form processing carried out by the user, it is possible to freely change the UI construction of the MFP 100. Also, when the user scans a form using the MFP, it is possible to select the form type via the UI of the MFP and an additional information file including a form type ID is uploaded together with an image file of the form from the MFP to the server computer 102.

By doing so, for the server computer 102 that receives the upload of the image file of the form, it is no longer necessary to carry out an identifying process for the form type, and therefore the processing load can be reduced. In addition, when a plurality of MFPs are connected to the network, it is possible to construct different UIs on the respective MFPs.

When an additional information file is attached to the image file received from the MFP 100, the server computer 102 reads the corresponding form type ID in accordance with the format of the additional information file and determines whether or not to double check the form type. When the form type is to be double checked, the form type is detected by the form recognition process, it is determined whether or not the detected form type matches the form type corresponding to the additional information file, and the image file is assigned to a process in accordance with the identified form type. In this way, by double checking the form type, it is possible to improve the accuracy with which the form type is identified. In addition, it is possible to correctly sort image data in advance into form types based on the additional information files and therefore to rapidly start the subsequent business process.

Although an example case where the network system is constructed as shown in FIG. 1 has been described for the above embodiment, the present invention is not limited to such and any number of devices (MFPs, client PCs) may be connected to the network. In addition, it is possible to use a construction where other scanners, printers, and the like aside from the MFPs are connected to the network. The network may be constructed of any type of network (a LAN, a WAN, the Internet, or the like).

Also, although an example where the UI of the MFP 100 is customized in accordance with the business content of a financial enterprise has been described in the above embodiment, the present invention is not limited to this and can be applied to a variety of business fields aside from the financial industry.

Although an example where the UI of the MFP 100 is made customizable and scanned forms are processed as electronic forms has been described in the above embodiment, the present invention is not limited to this and can be applied to the case where a document (hereinafter referred to as a "fax document") received by facsimile by the MFP 100 from an external appliance is processed as an electronic form.

An example where a fax document received by the MFP 100 from an external appliance is processed as an electronic form will now be described as a modified embodiment of the present invention.

In FIG. 1 described above, when the MFP 100 receives a regular fax document from an external appliance, the fax document is received via the telephone/fax line 105. Also, when the MFP 100 receives the fax document (an Internet fax document) from an external appliance via the Internet, the fax document is received via the gateway device 106 and the network 101.

Figures 16, 17:
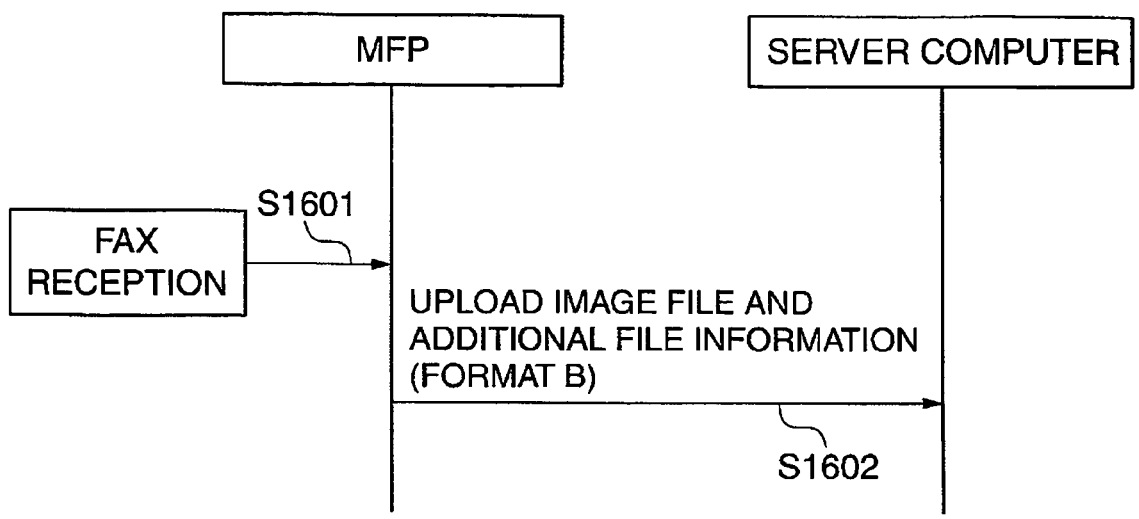
FIG. 16 is a diagram showing a communication process carried out between the MFP and the server computer in a network system of FIG. 1 when uploading a file.
FIG. 17 is a diagram showing one example where a content of data stored in the storage device used by the server computer appearing in FIG. 1 is expressed in table format.

FIG. 16 is a diagram showing a communication process carried out between the MFP 100 and the server computer 102 when uploading a file.

In FIG. 16, when a fax document is received by the network interface section 301 (step S1601), the CPU 302 of the MFP 100 converts the received fax document to an image file, attaches information such as the receiver fax number and fax reception time to the image file as an additional information file, and uploads the image file to the server computer 102 (step S1602).

FIG. 20 is a diagram showing an example where an additional information file 2000 is written in XML.

In FIG. 20, a sender fax number is stored in the element "From", a receiver fax number in the element "To", a date and time when the fax document was received in the element "ReceivedDateTime", and a number of generated image files in the element "NumberOfFiles".

In FIGS. 18 and 19, the CPU 403 of the server computer 102 proceeds with the same processing as in the steps S1801 to S1803 described above according to a program running on the server computer 102 and when the additional information file is an additional information file for a fax document (referred to here as "file format B"), the CPU 403 reads the receiver fax number from the additional information file (step S1805).

In the case of fax documents, different application fax numbers are assigned for the forms in advance, such as "03-5555-xxxx" for "credit card applications" and "03-5555-yyyy" for "loan applications", and as shown in FIG. 17, a correspondence table 1700 for the form type IDS of fax documents and the respective receiver fax numbers to which the fax documents reach is provided. By searching the correspondence table 1700, the CPU 403 can detect the form type of the received image file (step S1806). In the following steps S1807 to S1810 and steps S1901 to S1905, the processing proceeds in the same way as described earlier.

The modified embodiment has been described above for the example of a reception process for a fax document. By further expanding the formats of the additional information file, it is possible to obtain form type identification information from various types of appliance.

In the embodiment and its modification, the form recognition function of a program stored inside a server apparatus that is one example of a data processing apparatus causes a CPU to execute predetermined form recognition logic to thereby carry out a form recognition process to recognize the form type of an image data generated by reading an original form. At this time, the form recognition process carried out by the form recognition function of the program is controlled using an additional information file that is one example of control information obtained by the program.

Also, the additional information file may be defined so as to correspond to the functions of an image forming apparatus, such as a multifunction device with a form recognition function or a fax machine that reads an image data from a paper form.

Also, the additional information file may be information that can specify whether or not image data has been subjected to a predetermined form recognition process before the program obtains the image data.

When the additional information file indicates that the image data has already been subjected to the predetermined form recognition process by a multifunction device or the like before reception of the image data, control may be carried out to skip the processing of the form recognition function to omit the form recognition process for the image data.

Alternatively, even if the additional information file indicates that the predetermined form recognition process for the image data has already been carried out in advance, the form recognition logic may be started so that an input screen may be displayed via the display section 401 of the server apparatus to enquire whether or not the user wishes to have the form recognition logic repeat the recognition process. By operating a mouse or the like, the user who has seen the input screen can make an input to the input control section 400 and when such input validates the function that repeats the recognition process, the form recognition process may be carried out once again on data that has been formerly subjected to the form recognition process.

When an identifier used for communication of the additional information file is a fax number or a telephone number, for example, the program may omit form recognition using the form recognition logic. The form corresponding to the image data may be recognized as a form that corresponds to such fax number or telephone number and the subsequent processing may be automatically assigned.

This completes the description of the characteristics on the server apparatus side.

An image processing program that generates image data by reading an original form, a network interface section that transmits the generated image data, and a multifunction device 100 in which an additional information file that controls the form recognition process carried out at the receiver of the image data is stored have been described above as the data sender.

When a user has a form read using a reading means of an image processing apparatus, the user is enabled to select the form type via a user interface of the image processing apparatus and form type information is attached to an image file of the form that is then transmitted from the image processing apparatus to the server computer as a data processing apparatus. By doing so, the data processing apparatus that receives the transmission of the image file of the form does not need to carry out an identifying process for the form type and therefore the processing load of the data processing apparatus can be reduced. Also, when a plurality of image processing apparatuses are connected to a network, it is possible for the respective image processing apparatuses to construct different user interfaces.

According to the embodiments described above, when a comparison process is carried out to compare the form type obtained based on the additional information attached to the image file and the form type found by the form recognition process, it is determined whether or not the form types match and a process is assigned based on the identified form type. In this way, by double checking the form type, it is possible to raise the accuracy with which the form type is identified. In addition, by correctly sorting image data in advance into form types based on the additional information, it becomes possible to rapidly start the subsequent business process.

It is to be understood that the object of the present invention may also be accomplished by supplying a system or an apparatus with a storage medium (or a recording medium) in which a program code of software, which realizes the functions of either of the above described embodiment and its modification is stored, and causing a computer (or CPU or MPU) of the system or apparatus to read out and execute the program code stored in the storage medium.

In this case, the program code itself read out from the storage medium realizes the functions of either of the above described embodiment and its modification, and hence the program code and the storage medium in which the program code is stored constitute the present invention.

Examples of the storage medium for supplying the program code include a floppy (registered trademark) disk, a hard disk, a magnetic-optical disk, an optical disk such as a CD-ROM, a CD-R, a CD-RW, a DVD-ROM, a *DVD-RAM, a DVD-RW, a DVD+RW, a magnetic tape, a nonvolatile memory card, and a ROM. Alternatively, the program code may be downloaded from another computer, a database, or the like, not shown, connected to the Internet, a commercial network, a local area network, or the like.

Further, it is to be understood that the functions of either of the above described embodiment and its modification may be accomplished not only by executing a program code read out by a computer, but also by causing an OS (operating system) or the like which operates on the computer to perform a part or all of the actual operations based on instructions of the program code.

Further, it is to be understood that the functions of either of the above described embodiment and its modification may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Further, the form of the program may be an object code, a program code executed by an interpreter, or script data supplied to an OS.

This application claims the benefit of Japanese Application No. 2005-025613, filed Feb. 1, 2005, which is hereby incorporated by reference herein in its entirety.

What is claimed is:

1. A data processing apparatus comprising:
an image input unit that inputs image information of a form, to which form type information is attached;
a character recognizing unit that carries out a character recognition process on the image information inputted by said image input unit based on the attached form type information;
a storage unit that stores the image information and a result obtained in the character recognition process by said character recognizing unit;
a form recognizing unit that carries out a form recognition process on the image information inputted by said image input unit to obtain a form type; and a form type determining unit that determines whether the form type obtained by the form recognition process carried out by said form recognizing unit and a form type represented by the form type information inputted by said image input unit match, wherein said character recognizing unit carries out the character recognition process when said form type determining unit has determined that the form type obtained by said form recognizing unit and the form type represented by the form type information match.

2. A data processing apparatus according to claim 1, further comprising a form type input unit operable when said form type determining unit has determined that the form type obtained by said form recognizing unit and the form type represented by the form type information do not match and then one of these form types has been selected, to input the selected form type.

3. A data processing apparatus according to claim 1, further comprising a check unit that checks whether to carry out the determination by said form type determining unit, wherein when it is determined that the determination by said form type determining unit is to be carried out, said form recognizing unit carries out the form recognition process and said form type determining unit carries out the determination.

4. A data processing method implemented by a data processing apparatus, the method comprising:

an image input step of inputting image information of a form, to which form type information is attached;

a character recognizing step of carrying out a character recognition process on the image information inputted in said image input step based on the attached form type information;

a storing step of storing, in a computer-readable memory, the image information and a result obtained in the character recognition process in said character recognizing step;

a form recognizing step of carrying out a form recognition process on the image information inputted in said image input step to obtain a form type; and a form type determining step of determining whether the form type obtained in the form recognition process carried out in said form recognizing step and a form type represented by the form type information inputted in said image input step match, wherein the character recognition process is carried out in the character recognition step when it has been determined in the form type determining step that the form type obtained in said form recognizing step and the form type represented by the form type information match.

5. A data processing method according to claim 4 further comprising a form type input step of inputting a selected form type, when it has been determined in said form type determining step that the form type obtained in said form recognizing step and the form type represented by the form type information do not match and then one of these form types has been selected.

6. A data processing method according to claim 4, further comprising a check step of checking whether to carry out the determination in said form type determining step, wherein when it is determined that the determination in said form type determining step is to be carried out, the form recognition process is carried out in said form recognizing step and the determination is carried out in said form type determining step.

7. A computer-readable memory storing a program that when executed by a computer causes the computer to implement a data processing method comprising:

an image input module for inputting image information of a form, to which form type information is attached;

a character recognizing module for carrying out a character recognition process on the image information inputted by said image input module based on the attached form type information;

a storage module for storing, in a computer-readable memory, the image information and a result obtained in the character recognition process by said character recognizing module;

a form recognizing module for carrying out a form recognition process on the image information inputted by said image input module to obtain a form type; and a form type determining module for determining whether the form type obtained by the form recognition process carried out by said form recognizing module and a form type represented by the form type information inputted by said image input module match, wherein said character recognizing module carries out the character recognition process when said form type determining module has determined that the form type obtained by said form recognizing module and the form type represented by the form type information match.

8. A computer-readable memory according to claim 7, further comprising a form type input module operable when said form type determining module has determined that the form type obtained by said form recognizing module and the form type represented by the form type information do not match and then one of these form types has been selected, to input the selected form type.

9. A computer-readable memory according to claim 7, further comprising a check module for checking whether to carry out the determination by said form type determining module, wherein when it is determined that the determination by said form type determining module is to be carried out, said form recognizing module carries out the form recognition process and said form type determining module carries out the determination.

* * * * *